United States Patent [19]
Ruben

[11] Patent Number: 5,537,254
[45] Date of Patent: Jul. 16, 1996

[54] COMPACT SMALL FORMAT ZOOM LENS

[75] Inventor: Paul L. Ruben, Penfield, N.Y.

[73] Assignee: Eastman Kodak Company, Rochester, N.Y.

[21] Appl. No.: 159,978

[22] Filed: Nov. 30, 1993

[51] Int. Cl.⁶ ................................................. G02B 15/14
[52] U.S. Cl. ........................................ 359/682; 359/691
[58] Field of Search ..................... 359/691, 382

[56] References Cited

U.S. PATENT DOCUMENTS

| | | | |
|---|---|---|---|
| 3,942,874 | 3/1976 | Besenmatter et al. | 359/682 |
| 4,936,661 | 6/1990 | Betensky et al. | 359/692 |
| 4,976,522 | 12/1990 | Igarashi | 359/691 |
| 5,076,677 | 12/1991 | Sato | 359/691 |
| 5,153,777 | 10/1992 | Okada et al. | 359/692 |
| 5,270,867 | 12/1993 | Estelle | 359/692 |
| 5,315,440 | 5/1994 | Betensky et al. | 359/692 |
| 5,329,402 | 7/1994 | Sato | 359/691 |
| 5,339,195 | 8/1994 | Ogata | 359/691 |
| 5,381,268 | 1/1995 | Sato | 359/691 |

FOREIGN PATENT DOCUMENTS

| | | | |
|---|---|---|---|
| 0119109 | 9/1981 | Japan | 359/691 |
| 0109009 | 4/1990 | Japan | 359/691 |

OTHER PUBLICATIONS

U.S. patent application Ser. No. 07/792,504, filed Nov. 4, 1991, Now U.S. Pat. No. 5,315,440 issued May 24, 1994.

U.S. patent appliction Ser. No. 07/807,541, filed Dec. 13, 1991, now U.S. Pat. No. 5,270,867 issued Dec. 14, 1993.

*Primary Examiner*—Georgia Y. Epps
*Assistant Examiner*—Evelyn A. Lester
*Attorney, Agent, or Firm*—Leonard W. Treash, Jr.

[57] ABSTRACT

A zoom lens particularly suitable for use in a camera using small format film has two moving lens groups, a front negative group and a rear positive group. The rear positive group has a stop, a positive component and a negative component movable as a unit. The positive and negative components are substantially separated, for example, by more than 30 percent of the length of the lens in the wide angle position.

11 Claims, 1 Drawing Sheet

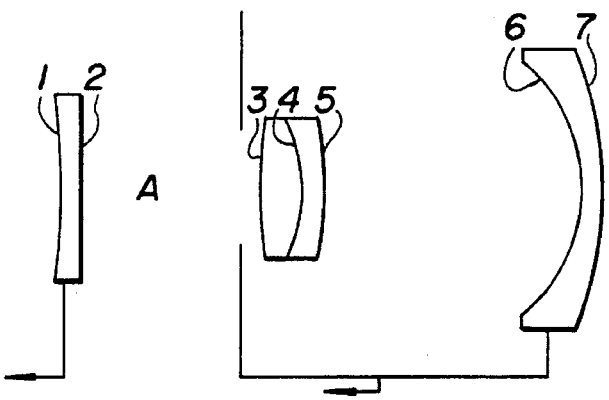
FIG. 1
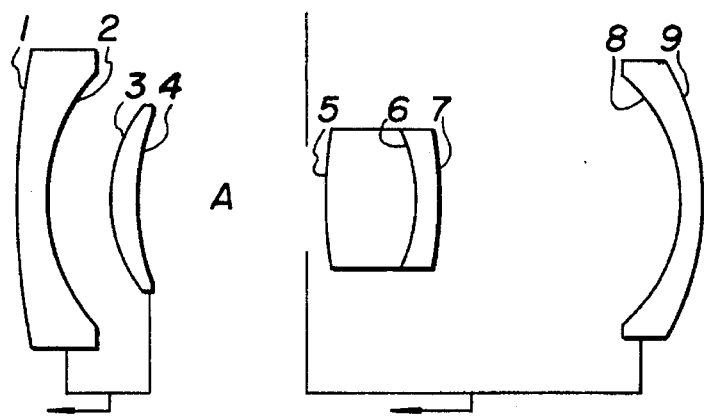
FIG. 2
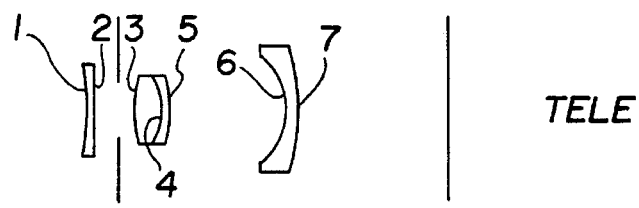
FIG. 3   TELE
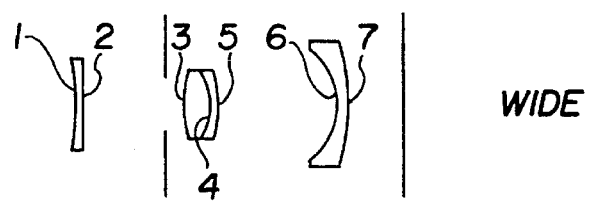
FIG. 4   WIDE
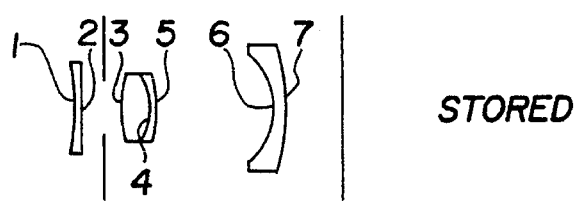
FIG. 5   STORED

COMPACT SMALL FORMAT ZOOM LENS

This invention relates to compact zoom lenses. Although not limited thereto, it is particularly applicable to a zoom lens for use with a small format film, for example, size 110 film.

U.S. Pat. No. 4,936,661 to E. I. Betensky et al, issued Jun. 26, 1990, describes a zoom lens with a short back focal length and having, from front to rear, negative power, positive power and negative power lens units. The negative unit closest to the image is movable during zooming to provide a majority of the change in focal length. In some of the examples, the front two units move as a single optical group during zooming, and in others, they move as separate groups relative to each other during zooming. These lenses have remarkable corrections and compactness for their aperture, zoom range and simplicity. The short back focal length makes them particularly useful in cameras having a separate viewfinder. See also, U.S. Pat. No. 5,153,777 to Okada et al, issued Oct. 6, 1992.

U.S. Pat. No. 5,270,867. Estelle, issued Dec. 14, 1993, shows a number of compact zoom lenses, many of the negative, positive, negative type, with a single front negative element separated by an aperture stop from a front positive component which can be a doublet. The zooming is primarily provided by substantial movement of a single strong negative rear element.

See also, U.S. Pat. No. 5,315,440 Betensky et al, issued May 2, 1994.

All of the above lenses have arrangements that might be considered to be negative-positive-negative, in that order, but all move the middle positive unit independently of the rear negative unit. In some instances, the middle unit is moved with the front negative unit and, in some instances, independently of it.

SUMMARY OF THE INVENTION

It is an object of the invention to provide a compact, inexpensive zoom lens particularly usable with small formats.

This and other objects are accomplished by a lens having two moving lens groups, a front negative group and a rear positive group. Each of the lens groups move as a unit for zooming. The rear positive group has, from front to rear, an aperture stop, a positive component and a negative component.

According to a preferred embodiment, the positive component of the rear position group, is preferably a doublet, and is substantially spaced from the negative component of the rear positive group, preferably by more than 25 percent of the length of the lens in the wide angle position and by more than the back focus of the lens in the wide angle position.

According to a further preferred embodiment, the lens has either four or five elements, including a single negative element making up the rear negative component and a positive doublet making up the positive component. The front negative group can either be a single negative element or airspaced negative and positive elements.

According to a further preferred embodiment, the lens has a stored position in which its extension from the film plane is substantially less than in either its wide angle or telephoto positions.

Lenses constructed according to the preferred embodiments are particularly suited as camera zoom lenses for films having very small formats, for example, the size 110 format which has a semi-diagonal of 11.77 millimeters. When constructed in this size, the lenses offer excellent corrections with a limited number of elements and without the necessity of aspheric surfaces. The lenses are compact despite a moderate back focus necessary to provide mechanical clearance for a size 110 cartridge.

BRIEF DESCRIPTION OF THE DRAWINGS

FIGS. 1 and 2 are cross-section schematics of alternative lenses.

FIGS. 3, 4 and 5 are cross-section schematics illustrating telephoto, wide angle and stored positions for the lens shown in FIG. 1.

DESCRIPTION OF THE PREFERRED EMBODIMENTS

In the following Examples, the surfaces are numbered from the front object side. Distances are in millimeters. Indexes and abbe (V) numbers are for the e line of the spectrum. The lenses were designed for a format having a semi-diagonal of 11.77, but can be scaled to other sizes.

| SURFACE | CLEAR APERTURE | AXIAL BEAM | RADIUS | THICKNESS | INDEX | V |
|---|---|---|---|---|---|---|
| 1 | 8.79 | 2.83 | −18.7918 | 1.200 | 1.788 | 47.4 |
| 2 | 8.29 | 2.92 | −244.544 | A | | |
| | 3.79 | 3.79 | DIAPHRAGM | 1.000 | | |
| 3 | 4.54 | 3.92 | 11.7621 | 2.291 | 1.501 | 56.4 |
| 4 | 4.90 | 3.85 | −5.02512 | 1.000 | 1.750 | 35.0 |
| 5 | 5.36 | 3.94 | −9.21898 | 15.969 | | |
| 6 | 10.63 | .94 | −7.31266 | 1.200 | 1.713 | 53.8 |
| 7 | 13.06 | .88 | −19.0090 | | | |

| FOCAL LENGTH | BACK FOCUS | FRONT FOCUS | ZOOM SPACING - A | LENS LENGTH |
|---|---|---|---|---|
| 22.65 | 7.01 | 23.24 | 7.900 | 30.561 |
| 31.11 | 10.92 | 41.51 | 4.216 | 26.876 |
| 42.74 | 16.30 | 66.62 | 1.531 | 24.191 |

| SURFACE | CLEAR APERTURE | AXIAL BEAM | RADIUS | THICKNESS | INDEX | V |
|---|---|---|---|---|---|---|
| 1 | 13.95 | 3.28 | 42.1746 | 1.500 | 1.620 | 60.3 |
| 2 | 11.21 | 3.23 | 8.14434 | 3.875 | | |
| 3 | 10.08 | 4.05 | 8.4413 | 1.732 | 1.603 | 38.0 |
| 4 | 9.23 | 3.95 | 10.3567 | A | | |
| | 4.23 | 4.23 | DIAPHRAGM | 1.000 | | |
| 5 | 4.90 | 4.41 | 9.69994 | 4.758 | 1.487 | 70.4 |
| 6 | 5.68 | 4.17 | −5.33844 | 1.191 | 1.724 | 38.1 |
| 7 | 6.22 | 4.26 | −10.8065 | 13.014 | | |
| 8 | 9.79 | 1.87 | −6.32998 | 1.200 | 1.620 | 60.3 |
| 9 | 11.87 | 1.87 | −12.3027 | | | |

| FOCAL LENGTH | BACK FOCUS | FRONT FOCUS | ZOOM SPACING - A | LENS LENGTH |
|---|---|---|---|---|
| 19.00 | 10.00 | 6.20 | 10.920 | 39.190 |
| 26.51 | 14.65 | 18.34 | 5.871 | 34.140 |
| 37.04 | 21.16 | 35.37 | 2.236 | 30.506 |

Example 1 has a semi-field varying from 23.32° to 14.96° and an f/number varying from 8 to 12.3 as focal length increases. Example 2 with an extra element has a semi-field varying from 32.56° to 17.34° and an f/number varying from 8 to 11.30 as focal length increases.

In Example 1 the focal length of the front group (surfaces 1 and 2) is −25.75 while the focal length of the rear group (surfaces 3–7) is 11.92. In Example 2 the focal length for the front negative group (surfaces 1–4) is −23.40 and the focal length of the rear positive group (surfaces 5–9) is 14.47. Preferably, the absolute value of the front focal length of the negative group should be at least 60 percent larger than the focal absolute value of the length of the second moving group. Note that in Example 1, the absolute value of the focal length of the first moving group is twice the focal length of the second moving group, while the sum of the absolute values of the focal lengths are substantially equal to the vertex to film plane distance in the wide angle position.

The ability to move the positive component and the negative component of the rear positive group together, of course, simplifies the moving mechanism compared to lenses in which all these components are separately moved.

Both of these lenses have a particularly wide field angle for this number of elements.

The stop location, located immediately in front of the positive component in the rear group and moving with the rear group, minimizes the lens element diameters at both ends of the lens assembly, thus minimizing the required lens barrel diameter and its weight.

By moving the rear group differentially toward the image plane and away from the front group, the focal length of the complete system varies from telephoto to wide angle while, at the same time, the front group moves toward the image plane in order to maintain a constant focus position. By arranging the cemented doublet in the rear group in close proximity to the preceding stop position, spherical aberration, coma and axial color are balanced between the two ends of the zoom range. Astigmatism, distortion and lateral color are balanced between the two ends of the zoom range by the shape of the single element in the front moving group and the shape of the negative element in the second moving group and the glass dispersions of these elements. The abbe V number of these glasses are preferably above 45 (for the e line of the spectrum), very preferably, above 50.

The invention has been described in detail with particular reference to a preferred embodiment thereof, but it will be understood that variations and modifications can be effected within the spirit and scope of the invention as described hereinabove and as defined in the appended claims.

I claim:

1. A compact zoom camera lens having two moving lens groups and a maximum of five lens elements, a front negative power group and a rear positive power group, each group moving as a unit for zooming, the rear positive group consisting of, in order from front to rear an aperture stop, a front positive component having no more than two elements and a rear negative component with no elements between the front positive component and the rear negative component.

2. The camera lens according to claim 1 wherein the front negative group consists of a single negative element.

3. The camera lens according to claim 1 wherein the front negative group consists of a negative element and a positive element airspaced from each other.

4. The camera lens according to claim 1 wherein the front positive component of the rear positive group is separated from the rear negative component of the rear positive group by a distance greater than 25 percent of the length of the said camera lens in its wide angle position.

5. The camera lens according to claim 4 wherein the distance between the two components in the rear positive group is at least equal to 45 percent of the length of said camera lens, vertex to vertex, in the wide angle position.

6. The camera lens according to claim 1 wherein the absolute value of the focal length of the front negative group is at least 1.6 times the absolute value of the focal length of the rear positive group.

7. The camera lens according to claim 6 wherein the sum of the absolute values of the focal lengths of the groups are substantially equal to the front vertex to rear focal plane distance in the wide angle position.

8. The camera lens according to claim 1 wherein the positive component is a doublet.

9. The camera lens according to claim 1 wherein the space between the two components in the rear positive lens group is greater than the back focus of said camera lens in the wide angle position.

10. The zoom camera lens constructed according to the following chart wherein the surfaces are numbered from the front object side to the rear image side, all distances are in millimeters, V is the abbe number and both V and the index are for the e line of the spectrum:

| SURFACE | CLEAR APERTURE | AXIAL BEAM | RADIUS | THICKNESS | INDEX | V |
|---|---|---|---|---|---|---|
| 1 | 8.79 | 2.83 | −18.7918 | 1.200 | 1.788 | 47.4 |
| 2 | 8.29 | 2.92 | −244.544 | A | | |
| | 3.79 | 3.79 | DIAPHRAGM | 1.000 | | |
| 3 | 4.54 | 3.92 | 11.7621 | 2.291 | 1.501 | 56.4 |
| 4 | 4.90 | 3.85 | −5.02512 | 1.000 | 1.750 | 35.0 |
| 5 | 5.36 | 3.94 | −9.21898 | 15.969 | | |
| 6 | 10.63 | .94 | −7.31266 | 1.200 | 1.713 | 53.8 |
| 7 | 13.06 | .88 | −19.0090 | | | |

| FOCAL LENGTH | BACK FOCUS | FRONT FOCUS | ZOOM SPACING - A | LENS LENGTH |
|---|---|---|---|---|
| 22.65 | 7.01 | 23.24 | 7.900 | 30.561 |
| 31.11 | 10.92 | 41.51 | 4.216 | 26.876 |
| 42.74 | 16.30 | 66.62 | 1.531 | 24.191 |

11. The zoom camera lens constructed according to the following chart wherein the surfaces are numbered from the front object side to the rear image side, all distances are in millimeters, V is the abbe number and both V and the index are for the e line of the spectrum:

| SURFACE | CLEAR APERTURE | AXIAL BEAM | RADIUS | THICKNESS | INDEX | V |
|---|---|---|---|---|---|---|
| 1 | 13.95 | 3.28 | 42.1746 | 1.500 | 1.620 | 60.3 |
| 2 | 11.21 | 3.23 | 8.14434 | 3.875 | | |
| 3 | 10.08 | 4.05 | 8.4413 | 1.732 | 1.603 | 38.0 |
| 4 | 9.23 | 3.95 | 10.3567 | A | | |
| | 4.23 | 4.23 | DIAPHRAGM | 1.000 | | |
| 5 | 4.90 | 4.41 | 9.69994 | 4.758 | 1.487 | 70.4 |
| 6 | 5.68 | 4.17 | −5.33844 | 1.191 | 1.724 | 38.1 |
| 7 | 6.22 | 4.26 | −10.8065 | 13.014 | | |
| 8 | 9.79 | 1.87 | −6.32998 | 1.200 | 1.620 | 60.3 |
| 9 | 11.87 | 1.87 | −12.3027 | | | |

| FOCAL LENGTH | BACK FOCUS | FRONT FOCUS | ZOOM SPACING A | LENS LENGTH |
|---|---|---|---|---|
| 19.00 | 10.00 | 6.20 | 10.920 | 39.190 |
| 26.51 | 14.65 | 18.34 | 5.871 | 34.140 |
| 37.04 | 21.16 | 35.37 | 2.236 | 30.506 |

\* \* \* \* \*